(12) United States Patent
Goertz et al.

(10) Patent No.: US 7,519,378 B2
(45) Date of Patent: Apr. 14, 2009

(54) METHOD AND TELECOMMUNICATIONS DEVICE FOR TRANSMITTING SERVICE MESSAGES TO A SERVICE CENTER AND RECEIVING SERVICE MESSAGES FROM A SERVICE CENTER

(76) Inventors: Werner Goertz, An der Seikenkapelle 19, 46282 Dorsten (DE); Marco van de Logt, Neu-Erscher-Weg 17, 47574 Goch (DE)

(*) Notice: Subject to any disclaimer, the term of this patent is extended or adjusted under 35 U.S.C. 154(b) by 363 days.

(21) Appl. No.: 10/527,770

(22) PCT Filed: Jun. 7, 2004

(86) PCT No.: PCT/EP2004/051047

§ 371 (c)(1),
(2), (4) Date: Mar. 11, 2005

(87) PCT Pub. No.: WO2004/110083

PCT Pub. Date: Dec. 16, 2004

(65) Prior Publication Data

US 2006/0040682 A1 Feb. 23, 2006

(30) Foreign Application Priority Data

Jun. 10, 2003 (DE) ................... 103 26 173

(51) Int. Cl.
*H04Q 7/20* (2006.01)

(52) U.S. Cl. ............... 455/466; 455/414.1; 455/412.1; 455/412.2

(58) Field of Classification Search ............. 455/466, 455/414.1, 412.1, 412.2
See application file for complete search history.

(56) References Cited

U.S. PATENT DOCUMENTS

| | | | |
|---|---|---|---|
| 6,424,841 B1 * | 7/2002 | Gustafsson | 455/466 |
| 6,546,241 B2 * | 4/2003 | Iyengar et al. | 455/412.1 |
| 2006/0034281 A1 * | 2/2006 | Cain et al. | 370/390 |

(Continued)

FOREIGN PATENT DOCUMENTS

DE 100 41 792 3/2002

OTHER PUBLICATIONS

ETSI TS 100 942 V7.0.0 (Aug. 1999) Digital cellular telecommunicationsystem (Phase 2+); Point-to-Point (PP) Short Message Service (SMS) support on mobile radio interface (GSM 04.11 version 7.0.0 Release 1998).

(Continued)

*Primary Examiner*—Nghi H Ly
(74) *Attorney, Agent, or Firm*—Baker Botts L.L.P.

(57) ABSTRACT

The present invention seeks to improve the downloading of downloadable information content that is directly or indirectly available in a service center (SZ), using a telecommunications device (TKG) to guarantee in a simple manner that the person initiating the download process bears the cost of the downloaded information content and that the service center (SZ) does not necessarily have to know or determine the subscriber's number of such person in order to transmit the information content. To achieve this, the information content is both requested from the service center (SZ), together with a first service message (SN1), in a first session (SI1) and is delivered by the service center (SZ), together with at least one second service message (SN2), in a second session (S12) via a single telecommunications like (TKV) that is set up between the telecommunications device (TKG) and the service center (SZ), without having to set up an additional telecommunications link, as is the case in prior art.

18 Claims, 5 Drawing Sheets

OTHER PUBLICATIONS

ETSI ES 201 912 V1.1.1 (Jan. 2002) Access and Terminals (AT); Short Message Service (SMS) for PSTN/ISDN; Short Message Communication between a fixed network Short Message Terminal Equipment and a Short Message Service Centre.

* cited by examiner

METHOD AND TELECOMMUNICATIONS DEVICE FOR TRANSMITTING SERVICE MESSAGES TO A SERVICE CENTER AND RECEIVING SERVICE MESSAGES FROM A SERVICE CENTER

BACKGROUND OF THE INVENTION

The transmission (sending and receiving) of service messages to/from a telecommunications device (such as a mobile telephone, a cordless telephone including a base station and at least one handset, a fixed network telephone, etc.) and vice versa is a communications service which must be distinguished in respect of the information content transmitted with the messages and which initially emerged in the mobile network area and, because of the high level of acceptance, now also has gradually established itself in the fixed network area. Of the plethora of services provided in the mobile radio network (such as the "Short Message (Messaging) Service (SMS)," the "Enhanced Message (Messaging) Service (EMS)," the "Multimedia Message (Messaging) Service (MMS)," "Instant Messaging," "Over The Air Activation (OTA)," e-mail, etc.) the trend in both the fixed and the mobile network currently appears to be towards a greater role for the SMS and MMS communication services. Whereas the SMS service already has been standardized for both the mobile and fixed network areas (for GSM: ETSI TS 100 942 V7. 0.0, Release 1998; for ISDN/PSTN: ETSI ES 201 912 V1.1.1, Release January 2002), for the MMS service this applies only to the mobile radio area, while standardization activities are currently underway in the fixed network area.

The SMS service in the fixed and mobile network is a point-to-point service characterized by purely push functionality; i.e., the content of the Short Message (SM) with a maximum length of 160 bytes is sent by the Short Message Service Center (SMSC) to the telecommunications device, with call setup being initiated by the service center. Whereas the SMS service operates on a connectionless basis in the mobile radio area between the telecommunications device and the Short Message Service Center, the short message being transmitted via a signaling channel without a circuit connection being established, in the fixed network the SMS service is handled on a connection-oriented basis whereby a circuit connection between the telecommunications device and the Short Message Service Center is established over which the short message is conveyed through implementation of the "Calling Line Identification (CLI)" feature known as "Calling Line Identification Presentation (CLIP)" using FSK and/or DTMF signaling (Frequency Shift Keying/Dual Tone Multiple Frequency).

On the other hand, in the case of the MMS service which, in the mobile radio network, is handled like the SMS service on a connectionless basis via a WAP transport path (using the Wireless Application Protocol), a different mechanism is employed in the fixed network: when a Multimedia Message (MM) whose size is, in principle, unlimited but is currently restricted to approximately 100 kbytes is sent to the telecommunications device, a notifying message, the so-called MMS Notification, is first sent, again on a connection-oriented basis, to inform the telecommunications device that a multimedia message is present at the Multimedia Message Service Center (MMSC). This takes place via a push service such as the SMS service. In contrast to receiving a short message, another call setup then must be initiated from the telecommunications device to the Multimedia Message Service Center in order to receive the content of the multimedia message.

Both the SMS service and the MMS service offer solutions for downloading information content, such as texts, multimedia content such as audio/video data (ringtones, screensavers), graphics, programs, etc., which is either stored in the relevant Service Center or can be made available by the Service Center through outsourcing.

Figure 1:
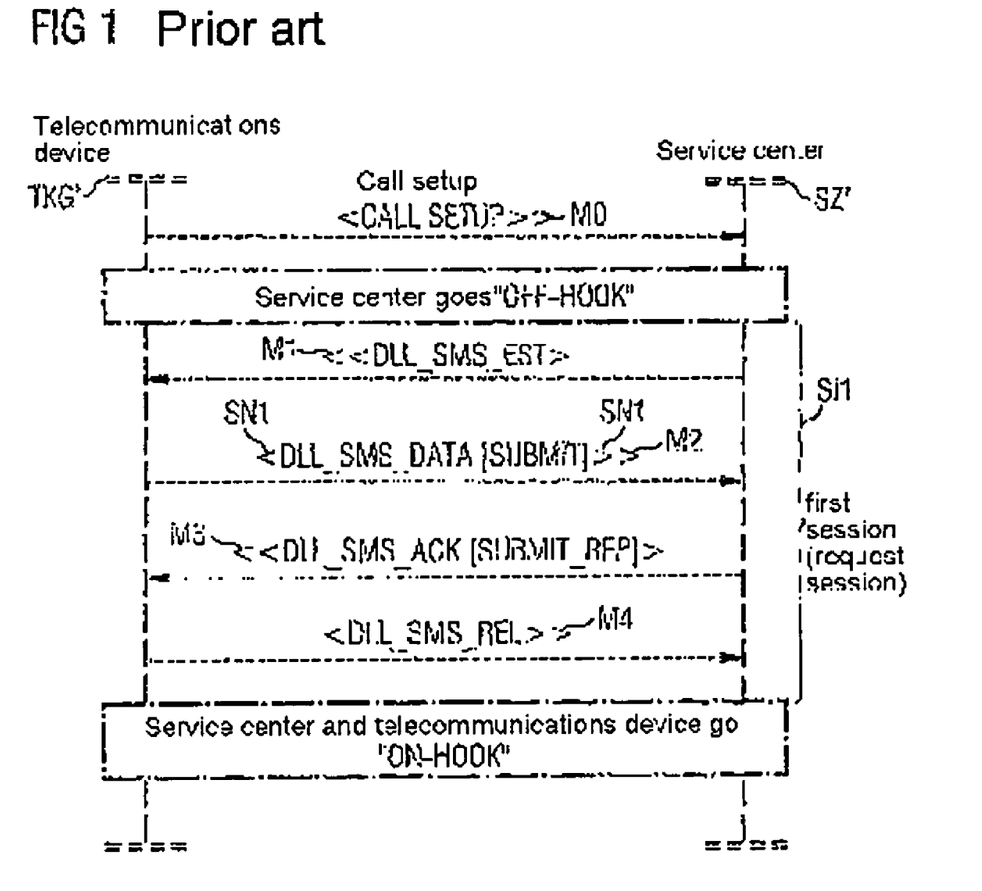
FIG. 1 shows a message flowchart for the requesting of information content by a telecommunications device from a service center, in particular a Short Message Service Center.
Figure 2:
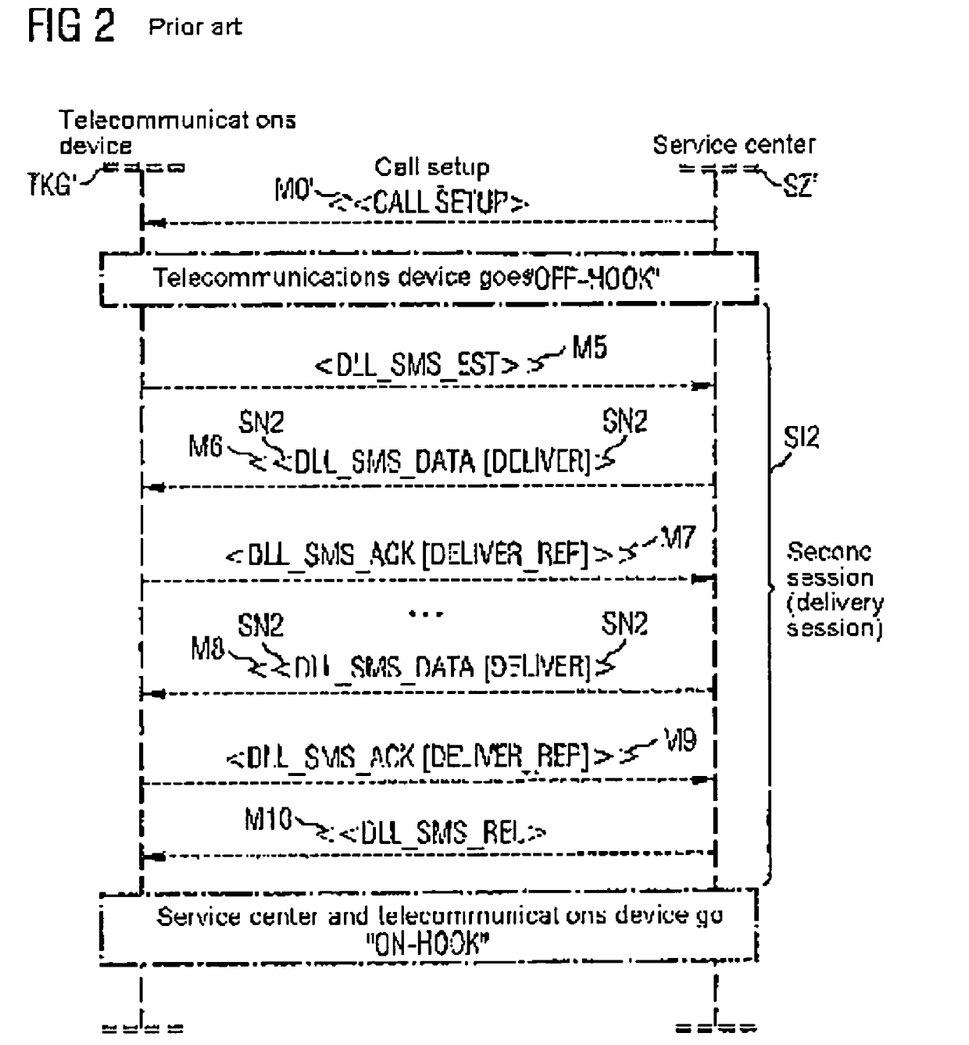
FIG. 2 shows a message flowchart for the delivery of the information content requested according to FIG. 1 to the telecommunication device by the service center, in particular the Short Message Service Center.
Figure 3:
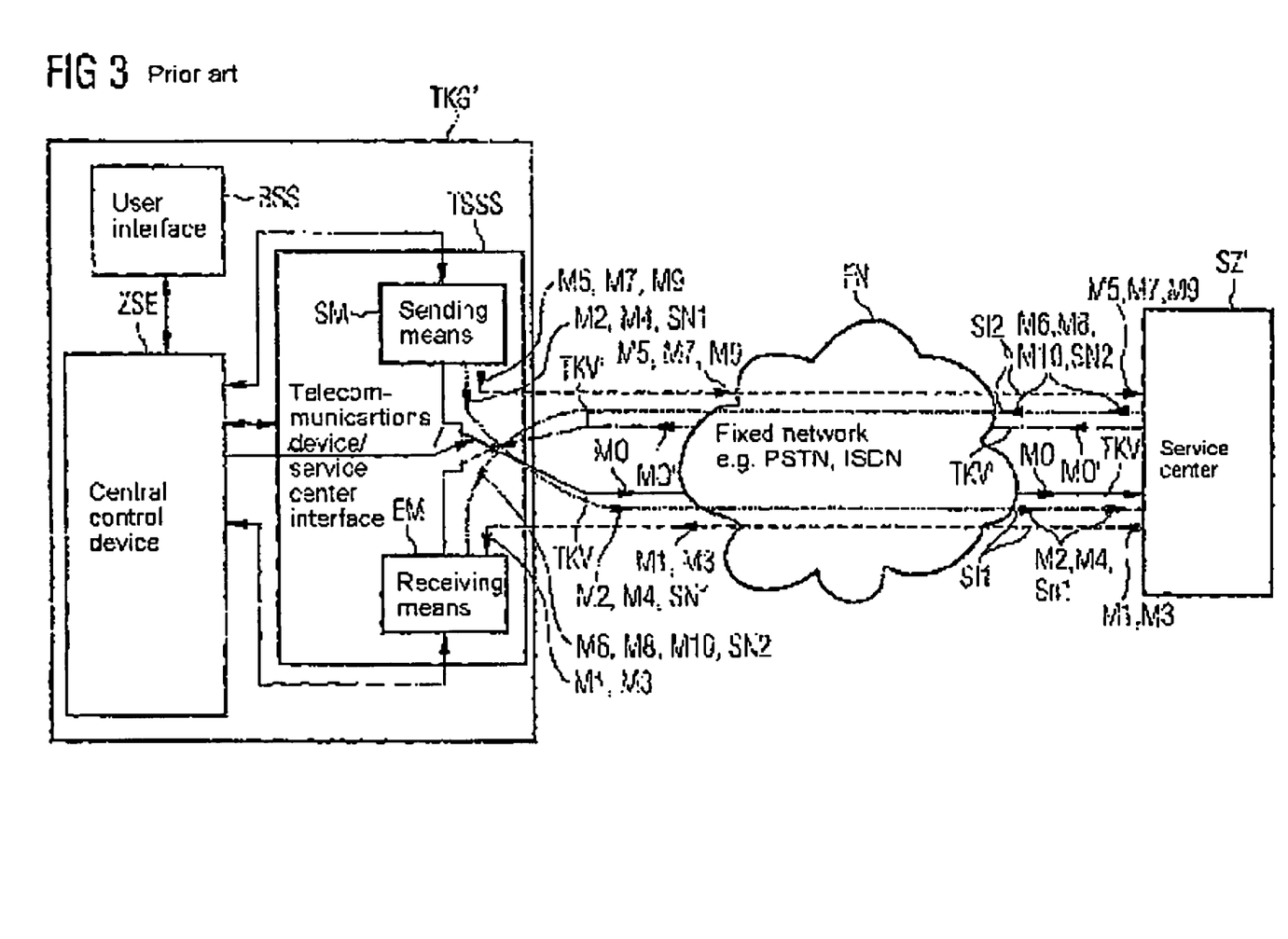
FIG. 3 shows the basic design of the telecommunications device both for requesting the information content from the service center, in particular the Short Message Service Center, according to FIG. 1 via a fixed network, and for delivery of the requested information content to the telecommunications device by the service center, in particular the Short Message Service Center, according to FIG. 2 via the fixed network.

It now will be shown, representatively for the SMS and MMS service in the mobile radio area and for the MMS service in the fixed network area, how a downloading scenario of this kind based on the message type defined in Annex B to Protocol 2 of ETSI Standard "ETSI ES 912 V1.1.1, Release January 2002" currently operates according to the prior art for the SMS service in the fixed network area, with reference to FIGS. 1 to 3.

FIG. 1 shows with reference to a message flowchart how a telecommunications device TKG', according to the prior art, requests information content, such as texts, multimedia content such as audio/video data (ringtones, screensavers), graphics, programs, etc., from a service center SZ', in particular a Short Message Service Center. For this purpose, the telecommunications device TKG' first sets up a call to the service center SZ'. To this end, it transmits a first message M0 with message content "CALL SETUP" to the service center SZ'. On receiving this first message M0, the service center SZ' assumes a first operating state "OFF-HOOK."

In this operating state, the service center SZ' then transmits a second message M1 with message content "DLL_SMS_EST" (Data Link Layer_Short Message Service_ESTablished) to the telecommunications device TKG', thereby initiating a first session SI1. With the second message M1, the service center SZ' notifies the telecommunications device TKG' that a DLL (Data Link Layer) connection exists.

In the first session SI1, on receiving the second message M1, the telecommunications device TKG' transmits a first service message SN1, in particular a short message, to the service center SZ' using a third message M2 and message content "DLL_SMS_DATA[SUBMIT]" (Data Link Layer_Short Message Service_DATA[SUBMIT]). With this first service message SN1 the telecommunications device TKG' requests from the service center SZ' quite specific information content required by the user of the telecommunications device TKG, e.g., texts, multimedia content such as audio/video data (ringtones, screensavers), graphics, programs, etc.

To acknowledge that it has received the first service message SN1 from the telecommunications device TKG', the service center SZ' sends a fourth message M3 with message content "DLL_SMS_ACK[SUBMIT_REP]" (Data Link Layer_Short Message Service_ACKnowledge[SUBMIT_REPeated]) to the telecommunications device TKG'. In this fourth message M3, the content of the first service message SN1 is sent back by the service center SZ' as a repetition to acknowledge receipt of the first service message SN1. In this way, the telecommunications device TKG' can check whether the first service message SN1 sent with the third message M2 has been completely and correctly received by the service center SZ'.

If this is the case, this completes the requesting of information content performed with the third message M2. Otherwise, the first service message SN1 transmitted with the third message M2 is re-transmitted. If this transmission attempt also fails, the telecommunications device TKG' has two options (not shown in FIG. 1):

Either it attempts to re-transmit until transmission has been successful or it aborts the transmission procedure. The result of the latter is that the telecommunications device TKG' cannot request the information content in the current first session SI1 and, if required, it must initiate a completely new procedure encompassing the first session SI1 (request session) immediately after aborting or with a time delay.

When the telecommunications device TKG' has ascertained that the sent first service message SN1 has been completely and correctly received by the service center SZ', the telecommunications device TKG' sends a fifth message M4 with message content "DLL_SMS_REL" (Data Link Layer_Short Message Service_RELease) to the service center SZ'. With this fifth message M4, the first session SI1 is released by the telecommunications device TKG'. After transmission of the fifth message M4, which therefore closes the first session SI1, both the service center SZ' and the telecommunications device TKG' assume a second operating state "ON-HOOK," thereby clearing down the existing call and terminating the requesting of information content by the telecommunications device TKG' according to the prior art.

FIG. 2 shows with reference to a message flowchart how the service center SZ', in particular the Short Message Service Center, delivers the information content requested by the telecommunications device TKG' as shown in FIG. 1 to the telecommunications device TKG' according to the prior art. For this purpose, the service center SZ' first transmits another first message M0' again with message content "CALL SETUP" to the telecommunications device TKG', causing the service center SZ' to set up a call to the telecommunications device TKG'. As a result of this call setup, the telecommunications device TKG' then assumes the first operating state "OFF-HOOK."

In this operating state, the telecommunications device TKG' then transmits a sixth message M5 with the same message content "DLL_SMS_EST" (Data Link Layer_Short Message Service_ESTablished) as in the second message M1 in FIG. 1 to the telecommunications device TKG', thereby initiating a second session SI2. With the sixth message M5, the telecommunications device TKG' informs the service center SZ' that a DLL (Data Link Layer) connection exists.

In the second session SI2, on receiving the sixth message M5, the service center SZ' transmits a second service message SN2, in particular again a short message, to the telecommunications device TKG' using a seventh message M6 and message content "DLL_SMS_DATA[DELIVER]" (Data Link Layer_Short Message Service_DATA[DELIVER]). With this second service message SN2, the service center SZ' delivers the information content requested by the telecommunications device TKG'; e.g., texts, multimedia content such as audio/video data (ringtones, screensavers), graphics, programs, etc.

If the service center SZ' does not have the information content requested by the telecommunications device TKG' (this eventuality is not shown in FIG. 2), instead of the seventh message M6 it transmits a warning to the telecommunications device TKG', informing the device of this fact and announcing that the existing second session SI2 will be released and the call terminated.

To acknowledge that it has received the second service message SN2 from the service center SZ', the telecommunications device TKG' sends an eighth message M7 with message content "DLL_SMS_ACK[DELIVER_REP]" (Data Link Layer_Short Message Service_ACKnowledge[DELIVER_REPeated]) to the service center SZ'. In this eighth message M7, the content of the second service message SN2 is sent back by the telecommunications device TKG' as a repetition to acknowledge receipt of the second service message SN2. In this way, the service center SZ' can check whether the second service message SN2 sent with the seventh message M6 has been completely and correctly received by the telecommunications device TKG'.

If this is the case, this completes the transmission of information content initiated with the seventh message M6. Otherwise, the second service message SN2 transmitted with the seventh message M6 is re-transmitted. If this transmission attempt also fails, the service center SZ' has two options (not shown in FIG. 2):

Either it attempts to re-transmit until transmission has been successful or it aborts the transmission procedure. The result of the latter is that the telecommunications device TKG' has not received the requested information content in the current second session SI2 and, if required, it must initiate a completely new procedure encompassing the first session SI1 (request session) and the second session SI2 (delivery session) immediately after aborting or with a time delay.

If the amount of information content to be delivered is so large that a second service message SN2 is insufficient, in terms of the maximum capacity transmittable with the message, to transit the information content to be delivered, the partial delivery handled with the seventh message M6 and the eighth message M7 is repeated until the service center SZ' has transmitted the second service message SN2 in the second session SI2 with a ninth message M8 and message content "DLL_SMS_DATA[DELIVER]" (Data Link Layer_Short Message Service_DATA[DELIVER]) for the last time for the complete delivery of the information content and until the telecommunications device TKG' has sent a tenth message M9 with message content "DLL_SMS_ACK[DELIVER_REP]" (Data Link Layer_Short Message Service_ACKnowledge[DELIVER_REPeated]) to the service center SZ' to confirm that it has received the last second service message SN2 from the service center SZ'.

In this tenth message M9, as in the eighth message M7, the content of the last second service message SN2 is sent back as a repetition. In this way, the service center SZ' now finally may check whether the second service message SN2 last transmitted by the telecommunications device TKG' with the ninth message M8 likewise has been completely and correctly received.

If this is the case, the information content transmission begun with the seventh message M6 is complete. If not, the second service message SN2 last transmitted with the ninth message M8 is transmitted once again. If this transmission attempt also fails, the service center SZ' has two options (not shown in FIG. 2):

Either it attempts to re-transmit until transmission has been successful or it aborts the transmission procedure. The result of the latter is that the telecommunications device TKG' has not completely (only partially) received the requested information content in the current second session SI2 and, if required, it must initiate a completely new procedure encompassing the first session SI1 (request session) and the second session SI2 (delivery session) immediately after aborting or with a time delay.

When the service center SZ' has established that the transmitted second service message SN2 has been completely and correctly received by the telecommunications device TKG', the service center SZ' sends an eleventh message M10 with the same message content "DLL_SMS_REL" (Data Link Layer_Short Message Service_RELease) as in the fifth message M4 in FIG. 1 to the telecommunications device TKG'. With this eleventh message M10, the second session SI2 is released by the service center SZ'. After transmission of the eleventh message M10, which therefore closes the second session SI2, both the service center SZ' and the telecommunications device TKG' assume the second operating state "ON-HOOK." This causes the set-up call to be cleared down again and delivery by the service center SZ' of the message content requested by the telecommunications device TKG' is complete according to the prior art.

FIG. 3 shows the basic design of the telecommunications device TKG' on the one hand for requesting information content from the service center SZ', in particular the Short Message Service Center, according to FIG. 1 via, for example, a Public Switched Telephone Network (PSTN) or fixed network FN implemented as an Integrated Services Digital Network (ISDN) and, on the other hand, for delivery of the requested information content to the telecommunications device TKG' by the service center SZ' according to FIG. 2 via the fixed network FN.

In order for the telecommunications device TKG' to transmit (send and receive) the messages M0, M0', M1 ... M10 and the first service message SN1 shown in FIGS. 1 and 2, the telecommunications device TKG' has a central control device ZSE for controlling the functional and operational sequences in the telecommunications device TKG', a user interface BSS and a telecommunications device/service center interface TSSS. The user interface BSS includes, for example the typical operating surface for telecommunications devices, consisting of a keypad, a display and electroacoustic transducers for voice input and voice output. The telecommunications device/service center interface TSSS and the user interface BSS are each connected to the central control device ZSE. The telecommunications device/service center interface TSSS additionally has a sending part SM and a receiving part EM which likewise are connected to the central control device ZSE and via which the telecommunications device TKG' is connected to the service center SZ' via the fixed network FN.

If the user of the telecommunications device TKG' wishes to call up and download user-specific information content such as texts, multimedia content (i.e., audio/video data, graphics, programs, etc.) from the service center SZ', he/she enters appropriate download-initiating commands on the user interface BSS and generates the first service message SN1, such as a short message, via the operating surface of the user interface BSS. These commands and the first service message SN1 are interpreted by the central control device ZSE. If the central control device ZSE detects, on the basis of this interpretation of the commands and the first service message SN1, that the user of the telecommunications device TKG' wishes to set up a telecommunications call TKV to the service center SZ', the telecommunications device/service center interface TSSS and, in particular, the sending part SM in this interface is activated by the central control device ZSE in such a way that initially the first message M0 is transmitted via the fixed network FN to the service center SZ', causing the telecommunications call TKV required by the user of the telecommunications device TKG' to be set up according to FIG. 1.

Via this set-up, telecommunications call TKV, the messages M1 ... M4 shown in FIG. 1 and corresponding to the first session SI1, including the generated first service message SN1, are then transmitted between the telecommunications device TKG' and the service center SZ' in the sequence and transmission direction illustrated. For this purpose, depending on which message and whether the first service message SN1 is to be transmitted (sent or received), either the sending part SM or the receiving part EM in the telecommunications device/service center interface TSSS is connected to the service center SZ' by line connection by the central control device ZSE in the telecommunications device TKG'.

If the messages M1 ... M4 and the first service message SN1 corresponding to the first session SI1 have been transmitted completely and correctly, the checking possibly required for this purpose on the part of the telecommunications device TKG', including generation of the acknowledgment message, being performed in the central control device ZSE, and if, therefore, both the first session SI1 is released and finally the telecommunications call TKV between the telecommunications device TKG' and the service center SZ' is cleared down as detailed in FIG. 1, delivery of the information content requested by the user of the telecommunications device TKG' by the service center SZ' according to FIG. 2 can now commence.

For this purpose, the service center SZ' sets up, with a time delay, another telecommunications call TKV to the telecommunications device TKG'. To this end, it sends the further first message M0' to the telecommunications device TKG' as shown in FIG. 2. Via this set-up telecommunications call TKV', the messages M5 ... M10 shown in FIG. 2 and corresponding to the second session SI2, including the second service message SN2 generated by the service center SZ', are then transmitted between the telecommunications device TKG' and the service center SZ' in the sequence and transmission direction illustrated. For this purpose, depending on which message is to be transmitted (sent or received) and whether the second service message SN2 is being transmitted, either the sending part SM or the receiving part EM in the telecommunications device/service center interface TSSS is connected to the service center SZ' by line connection by the central control device ZSE in the telecommunications device TKG'.

If the messages M5 ... M10 and the second service message SN2 corresponding to the second session SI2 have been transmitted completely and correctly, the checking on the part of the telecommunications device TKG', including generation of the acknowledgment message, possibly required for this purpose being performed in the central control device ZSE, and if both the second session SI2 is released and finally the telecommunications call TKV' between the telecommunications device TKG' and the service center SZ' is cleared down as detailed in FIG. 2, downloading (requesting and delivering) of the information content required by the user of the telecommunications device TKG' is terminated or complete.

Accordingly, the present invention seeks to provide a method and telecommunications device for transmitting service messages to a service center and receiving service messages from a service center, wherein the downloading of downloadable information content directly or indirectly available in the service center is improved with a view to ensuring in a simple manner that each person who initiates downloading also bears the costs for the downloaded information content and that the service center does not necessarily need to know or ascertain that person's directory number for transporting the information content.

SUMMARY OF THE INVENTION

The invention is therefore directed toward a telecommunications device which sets up a telecommunications call to a service center and which, during this call, the telecommunications device both requests the information content from the service center in a first session (request session) with a first service message and receives the information content from the service center in a second session (delivery session) with at least one second service message; i.e., without another telecommunications call having to be set up as in the prior art.

For the SMS service in the fixed network, this refers to the "Short Message Service (SMS)" specified in ETSI publication "ETSI ES 201 912 V1.1.1, Release January 2002" being extended in respect of the transmission protocol in such a way that, in addition to a "push functionality" with the implementation of the "Calling Line Identification (CLI)" feature known as "Calling Line Identification Presentation (CLIP)," a "pull functionality" is created for which the CLIP function is no longer required. As a large number of telecommunications devices do not possess such CLIP functionality, the "pull functionality" offers the user of these devices the possibility of being able to download various information content (e.g., images, ringtones, weather reports, etc.) from the service center by user input. In some cases, automatic downloading of content by the device also is possible.

The present invention defines a complete solution for mapping the SMS service in the fixed network to every fixed network line, regardless of whether or not this line has CLIP functionality.

All in all, the present invention, whereby the requesting of information content from the service center by the telecommunications device and the delivery of the information content to the telecommunications device by the service center take place via a single telecommunications call, gives rise to the following advantages compared to the prior art:

(i) CLIP function no longer necessary for downloading information content;

(ii) the call is released by the telecommunications device, whereby no costs are incurred by the service center, these being charged to the user of the telecommunications device alone;

(iii) the service center no longer needs to set up a call, thereby reducing service center complexity and producing a cost benefit for the service center operator;

(iv) the service center can be operated in a location-independent manner in relation to the telecommunications device, thereby enabling the service center to be located abroad, while the telecommunications device is operated in the home country;

(v) a simple operating surface on the telecommunications device for downloading information content is possible, because the relevant user interface can be implemented independently from the other SMS user interface;

(vi) from the service center operator's standpoint, the costs of downloading (requesting and delivering) can be charged via a directory number specifically provided for the purpose; and (vii) for downloading, any CLIR (Calling Line Identification Restriction) function present does not need to be activated.

In further embodiments of the present invention, the telecommunications device relinquishes control of the telecommunications call to the service center on commencement of the second session, thereby eliminating unnecessarily long second sessions at the telecommunications device user's expense.

Additional features and advantages of the present invention are described in, and will be apparent from, the following Detailed Description of the Invention and the Figures.

DETAILED DESCRIPTION OF THE INVENTION

Figure 4:
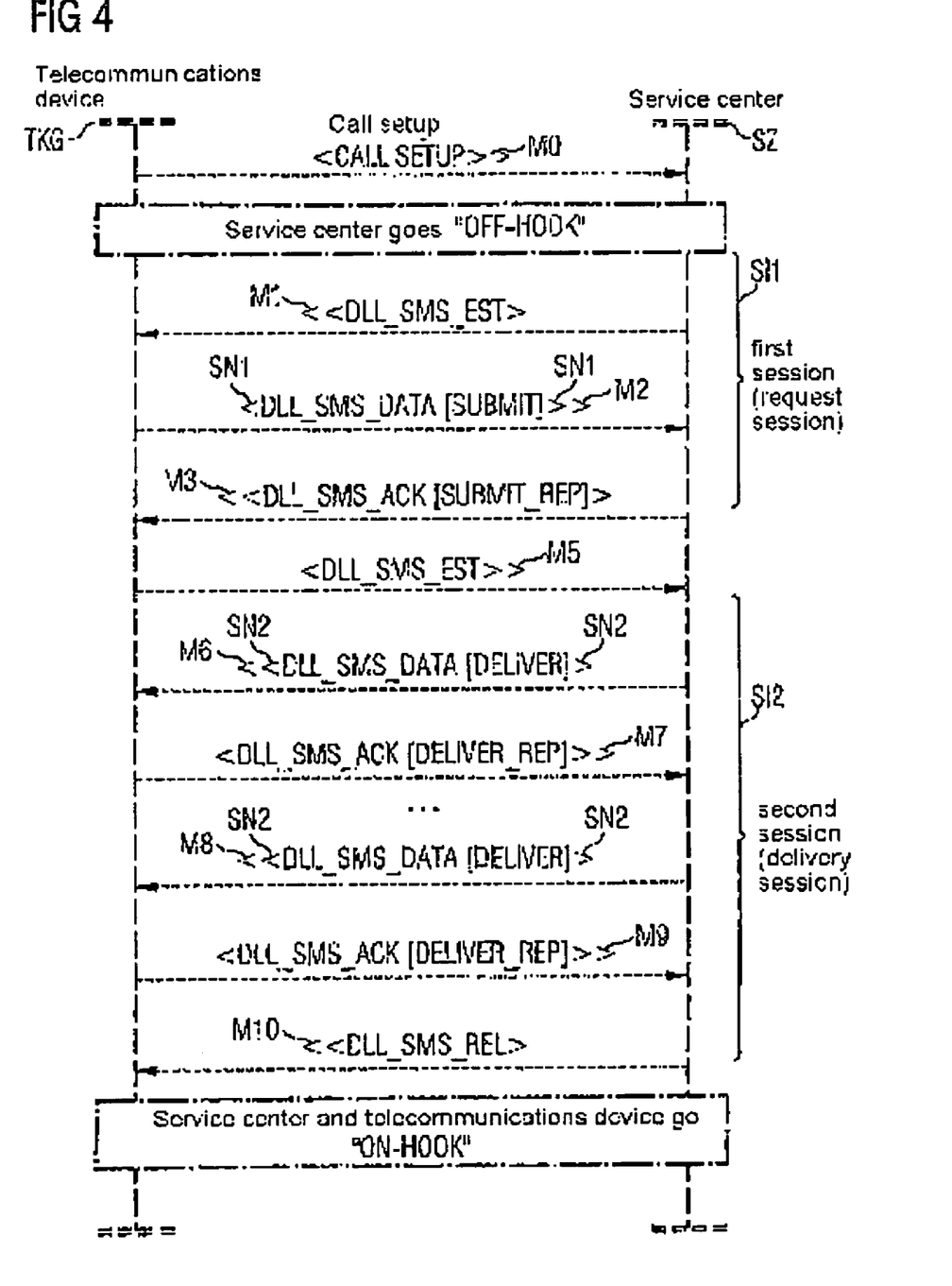
FIG. 4 shows the message flowchart for the requesting of information content by a telecommunication device from a service center, in particular a Short Message Service Center, and the delivery of the requested information content to the telecommunications device by the service center, in particular the Short Message Service Center, via a telecommunications network.

FIG. 4 shows with reference to a message flowchart how a telecommunications device TKG that has been modified compared to the TKG' in FIGS. 1 to 3 requests information content (e.g., texts, multimedia content such as audio/video data (ringtones, screensavers), graphics, programs, etc.) from a service center SZ that has been modified compared to the service center SZ' in FIGS. 1 to 3, in particular a Short Message Service Center. For this purpose, the telecommunications device TKG first sets up a call to the service center SZ. To this end, it transmits, as in FIG. 1, the first message M0 with message content "CALL SETUP" to the service center SZ. On receiving this first message M0, the service center SZ assumes the first operating state "OFF-HOOK."

In this operating state, the service center SZ then transmits, as in FIG. 1, the second message M1 with message content "DLL_SMS_EST" (Data Link Layer_Short Message Service_ESTablished) to the telecommunications device TKG, thereby initiating a first session SI1. With the second message M1, the service center SZ informs the telecommunications device TKG that a DLL (Data Link Layer) connection exists.

In the first session SI1, on receiving the second message M1, the telecommunications device TKG transmits the first service message SN1, in particular a short message, to the service center SZ using the third message M2 and message content "DLL_SMS_DATA[SUBMIT]" (Data Link Layer_Short Message Service_DATA[SUBMIT]) as in FIG. 1. With this first service message SN1, the telecommunications device TKG requests from the service center SZ quite specific information content required by the user of the telecommunications device TKG; e.g., texts, multimedia content such as audio/video data (ringtones, screensavers), graphics, programs, etc.

To acknowledge that it has received the first service message SN1 from the telecommunications device TKG, the service center SZ sends, again as in FIG. 1, the fourth message M3 with message content "DLL_SMS_ACK[SUBMIT_REP]" (Data Link Layer_Short Message Service_ACKnowledge[SUBMIT_REPeated]) to the telecommunications device TKG. In this fourth message M3, the content of the first service message SN1 is sent back by the service center SZ as a repetition to acknowledge receipt of the first service message SN1. In this way, the telecommunications device TKG can check whether the first service message SN1 sent with the third message M2 has been completely and correctly received by the service center SZ.

If this is the case, this completes the requesting of information content performed with the third message M2. Otherwise, the first service message SN1 transmitted with the third message M2 is re-transmitted. If this transmission attempt also fails, the telecommunications device TKG, like the telecommunications device TKG' according to FIG. 1, has two options (likewise not shown in FIG. 4):

Either it attempts to re-transmit until transmission has been successful or it aborts the transmission procedure. The result of the latter is that the telecommunications device TKG cannot request the information content in the current first session SI1 and, if required, it must initiate a completely new procedure encompassing the first session SI1 (request session) immediately after aborting or with a time delay.

When the telecommunications device TKG has ascertained that the sent first service message SN1 has been completely and correctly received by the service center SZ, the telecommunications device TKG does not, as in FIG. 1, send the fifth message M4 with message content "DLL_SMS_REL" (Data Link Layer_Short Message Service_RELease) to the service center SZ, which would have caused the first session SI1 to be released and, finally, the call to be cleared down by the telecommunications device TKG. Instead, it sends, as in FIG. 2, the sixth message M5 with the same message content "DLL_SMS_EST" (Data Link Layer_Short Message Service_ESTablished) as in the second message M1 to the service center SZ. With the sixth message M5, the telecommunications device TKG not only notifies the service center SZ that the DLL (Data Link Layer) connection still exists, but also that there takes place a direct changeover from the first session SI1, the request session, to the second session SI2, the delivery session, without the existing (old) call being cleared down and another (new) call being set up as in FIGS. 1 and 2.

In other words:

With the transmission of the sixth message M5 by the telecommunications device TKG, without the fifth message M4 being previously transmitted by same, the first session SI1 is terminated and the second session SI2 is simultaneously initiated during the existing call, without the existing call having to be cleared down and a new call set up.

In the second session SI2 thus initiated, on receipt of the sixth message M5, the service center SZ re-transmits, as in FIG. 2, the second service message SN2, in particular again a short message, to the telecommunications device TKG with the seventh message M6 and message content "DLL_SMS_DATA[DELIVER]" (Data Link Layer_Short Message Service_DATA[DELIVER]). With this second service message SN2, the service center SZ delivers the information content requested by the telecommunications device TKG; e.g., texts, multimedia content such as audio/video data (ringtones, screensavers), graphics, programs, etc.

If the service center SZ does not have the information content requested by the telecommunications device TKG (this eventuality is not shown in FIG. 4), instead of the seventh message M6, it transmits a warning to the telecommunications device TKG, informing the device of this fact and advising it that the existing second session SI2 will be released and the call terminated.

To acknowledge that it has received the second service message SN2 from the service center SZ, the telecommunications device TKG sends, as in FIG. 2, the eighth message M7 with message content "DLL_SMS_ACK[DELIVER_REP]" (Data Link Layer_Short Message Service_ACKnowledge[DELIVER_REPeated]) to the service center SZ. In this eighth message M7, the content of the second service message SN2 is sent back by the telecommunications device TKG as a repetition to acknowledge receipt of the second service message SN2. In this way, the service center SZ can check whether the second service message SN2 sent with the seventh message M6 has been completely and correctly received by the telecommunications device TKG.

If this is the case, this completes the transmission of information content performed with the seventh message M6. Otherwise, the second service message SN1 transmitted with the seventh message M6 is re-transmitted. If this transmission attempt also fails, the service center SZ as according to FIG. 2 has two options (not shown in FIG. 4):

Either it attempts to re-transmit until transmission has been successful or it aborts the transmission procedure. The result of the latter is that the telecommunications device TKG has not received the requested information content in the current second session SI2 and, if required, it must initiate a completely new procedure encompassing the first session SI1 (request session) and the second session SI2 (delivery session) immediately after aborting or with a time delay.

If the amount of information content to be delivered is so large that a second service message SN2 is insufficient, in terms of the maximum capacity transmittable with the message, to transit the information content to be delivered, the partial delivery handled with the seventh message M6 and the eighth message M7 is repeated until the service center SZ has transmitted the second service message SN2 in the second session SI2, as in FIG. 2, with the ninth message M8 and message content "DLL_SMS_DATA[DELIVER]" (Data Link Layer_Short Message Service_DATA[DELIVER]) for the last time for the complete delivery of the information content and until the telecommunications device TKG has sent a tenth message M9 with message content "DLL_SMS_ACK[DELIVER_REP]" (Data Link Layer_Short Message Service_ACKnowledge[DELIVER_REPeated]) to the service center SZ to acknowledge that it has received the last second service message SN2 from the service center SZ.

In this tenth message M9, as in the eighth message M7, the content of the last second service message SN2 is sent back as a repetition. In this way, the service center SZ now finally may check whether the second service message SN2 last transmitted with the ninth message M8 likewise has been completely and correctly received by the telecommunications device TKG.

If this is the case, this completes the information content transmission begun with the seventh message M6. If not, the second service message SN2 last transmitted with the ninth message M8 is transmitted once again. If this transmission attempt also fails, the service center SZ again has two options (not shown in FIG. 4):

Either it attempts to re-transmit until transmission has been successful or it aborts the transmission procedure. The result of the latter is that the telecommunications device TKG has not completely (only partially) received the requested information content in the current second session SI2 and, if required, it must initiate a completely new procedure encompassing the first session SI1 (request session) and the second session SI2 (delivery session) immediately after aborting or with a time delay.

When the service center SZ has established that the transmitted second service message SN2 has been completely and correctly received by the telecommunications device TKG, the service center SZ sends the eleventh message M10, as in FIG. 2, with the same message content "DLL_SMS_REL" (Data Link Layer_Short Message Service_RELease) to the telecommunications device TKG. With the eleventh message M10, the second session SI2 is released by the service center SZ. After transmission of the eleventh message M10, which therefore terminates the second session SI2, both the service center SZ and the telecommunications device TKG assume the second operating state "ON-HOOK." This causes the set-up call to be cleared down and delivery by the service center SZ of the message content requested by the telecommunications device TKG according to the present invention is complete.

Figure 5:
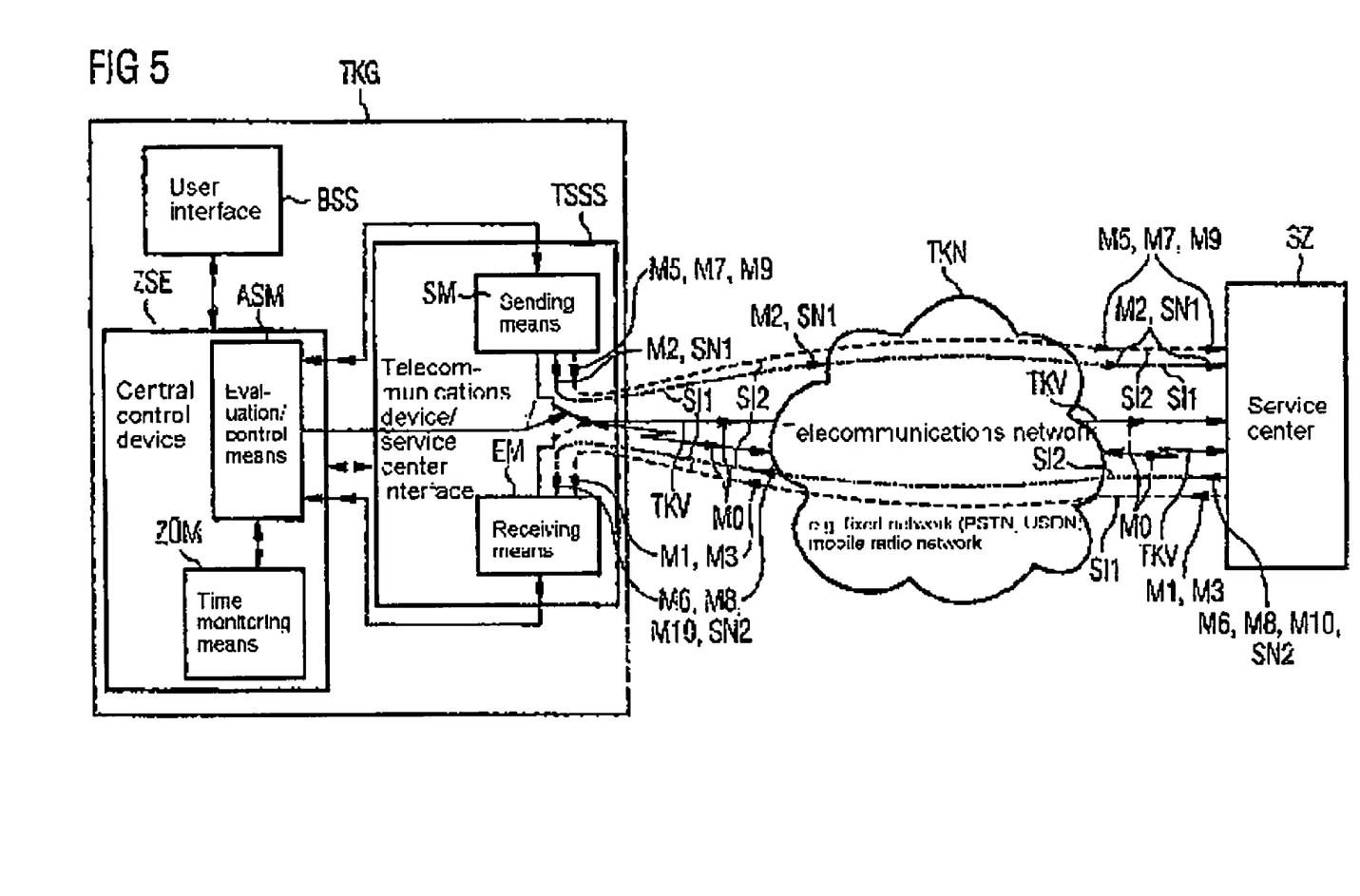
FIG. 5 shows the basic design of the telecommunications device for the requesting of information content from the service center, particularly the Short Message Service Center, by the telecommunications device and delivery of the requested information content to the telecommunications device by the service center, in particular the Short Message Service Center, according to FIG. 4 via a telecommunications network.

FIG. 5 shows the basic design of the telecommunications device TKG for requesting information content from the service center SZ, in particular the Short Message Service Center, and delivery of the requested information content to the telecommunications device TKG by the service center SZ according to FIG. 4 via a telecommunications network TKN implemented, for example, as a fixed network FN [Public Switched Telephone Network (PSTN)] or as an Integrated Services Digital Network (ISDN) or as a mobile network.

In order for the telecommunications device TKG to transmit (send and receive) the messages M0, M1 . . . M3, M5 . . . M10 and the two service messages SN1, SN2 shown in FIG. 4, the telecommunications device TKG, like the telecommunications device TKG' in FIG. 3, has the central control device ZSE for controlling the functional and operational sequences in the telecommunications device TKG, the user interface BSS and the telecommunications device/service center interface TSSS. In contrast to the telecommunications device TKG' in FIG. 3, the central control device ZSE of the telecommunications device TKG has an evaluation/control part ASM and a time monitoring part ZÜM preferably implemented as program modules and forming a functional unit, as indicated by the connection between the two part in FIG. 5

The user interface BSS again including, for example, the typical operating surface for telecommunications devices, consisting of a keypad, a display and electroacoustic transducers for voice input and output. The telecommunications device/service center interface TSSS and the user interface BSS are again each connected to the central control device ZSE. The telecommunications device/service center interface TSSS again additionally has a sending part SM and a receiving part EM which likewise are connected to the central control device ZSE and via which the telecommunications device TKG is connected to the service center SZ via the fixed network FN.

If the user of the telecommunications device TKG wishes to call up and download user-specific information content such as texts, multimedia content (e.g., audio/video data, graphics, programs, etc.) from the service center SZ, he/she enters appropriate download-initiating commands on the user interface BSS and generates the first service message SN1 SN1 (e.g., a short message) via the operating surface of the user interface BSS. These commands and the first service message SN1 are interpreted by the central control device ZSE. If the central control device ZSE detects, on the basis of this interpretation of the commands and the first service message SN1, that the user of the telecommunications device TKG wishes to establish a telecommunications call TKV to the service center SZ, the telecommunications device/service center interface TSSS and, in particular, the sending part SM in this interface is controlled by the evaluation/control part ASM in such a way that initially the first message M0 is transmitted via the telecommunications network TKN to the service center SZ, causing the telecommunications call TKV required by the user of the telecommunications device TKG to be set as illustrated in FIG. 4.

Via this set-up telecommunications call TKV, the messages M1 . . . M3 shown in FIG. 4 and corresponding to the first session SI1, including the generated first service message SN1, are then transmitted between the telecommunications device TKG and the service center SZ in the sequence and transmission direction illustrated. For this purpose, depending on which message and whether the first service message SN1 is to be transmitted (sent or received), either the sending part SM or the receiving part EM in the telecommunications device/service center interface TSSS are connected by the evaluation/control part ASM in the central control device ZSE in the telecommunications device TKG to the service center SZ by line connection if the telecommunications network is a fixed network, or by activation of an air interface if the telecommunications network is a mobile network.

If the messages M1 . . . M3 and the first service message SN1 corresponding to the first session SI1 have been transmitted completely and correctly, the checking which is possibly required for this purpose on the part of the telecommunications device TKG, including generation of the acknowledgment message, being performed by the evaluation/control part ASM in the central control device ZSE, the sixth message M5 has been sent to the service center SZ and, therefore, direct changeover from the first session SI1, the request session, to the second session SI2, the delivery session SI2, has taken place without the existing (old) call being cleared down and another (new) call set up as in FIGS. 1 and 2, delivery of the information content requested by the user of the telecommunications device TKG by the service center SZ can now commence.

For this purpose, the messages M5 . . . M10 shown in FIG. 4 and corresponding to the second session SI2, including the second service message SN2 generated by the service center SZ, are transmitted between the telecommunications device TKG and the service center SZ in the sequence and transmission direction illustrated. For this purpose, depending on which message is to be transmitted (sent or received) and whether the second service message SN2 is transmitted, either the sending part SM or the receiving part EM in the telecommunications device/service center interface TSSS is again connected by the evaluation/control part ASM in the central control device ZSE in the telecommunications device TKG to the service center SZ by line connection if the telecommunications network is a fixed network, or by activation of an air interface if the telecommunications network is a mobile network.

If the messages M5 . . . M10 and the second service message SN2 corresponding to the first session SI1 have been transmitted completely and correctly, the checking possibly required for this purpose on the part of the telecommunications device TKG, including generation of the acknowledgment message, being performed by the evaluation/control part ASM in the central control device ZSE, and if therefore as illustrated in FIG. 4 both the second session SI2 has been released and finally the telecommunications call TKV between the telecommunications device TKG and the service center SZ has been cleared down, downloading (request and delivery) of the information content required by the user of the telecommunications device TKG from the service center SZ is terminated or complete.

In order for downloading of the information content via the telecommunications call TKV set up by the telecommunications device TKG and chargeable to the user not to incur unnecessary costs for maintaining the telecommunications call TKV set-up, the central control device ZSE of the telecommunications device TKG contains the time monitoring part ZÜM. Such time monitoring part ZÜM enables the duration of the second session SI2, normally 60 seconds, to be monitored.

Although the present invention has been described with reference to specific embodiments, those of skill in the art will recognize that changes may be made thereto without departing from the spirit and scope of the present invention as set forth in the hereafter appended claims.

The invention claimed is:

1. A method for sending and receiving service messages to and from a service center, the method comprising:
setting up a telecommunications call to the service center via a telecommunications device;
initiating, by the service center, a first session via the telecommunications call set-up;
sending, via the telecommunications device and in the first session, a first service message to the service center, receipt of which is acknowledged by the service center;
initiating, by the telecommunications device and as a result of acknowledgment by the service center, a second session via the telecommunications call set-up;
sending, by the service center and in the second session, at least one second service message to the telecommunications device, receipt of which is acknowledged by the telecommunications device; and
releasing, by the service center and as a result of acknowledgement by the telecommunications device, the second session so as to clear down the telecommunications call.

2. A method for sending and receiving service messages to and from a service center as claimed in claim 1, wherein a duration of the second session is monitored by the telecommunications device.

3. A method for sending and receiving service messages to and from a service center as claimed in claim 2, wherein the duration is 60 seconds.

4. A method for sending and receiving service messages to and from a service center as claimed in claim 1, the method further comprising requesting by the telecommunications device, with the first service message in the first session, downloadable information content which is one of stored in the service center, made available by the service center and procured by the service center.

5. A method for sending and receiving service messages to and from a service center as claimed in claim 4, the method further comprising transmitting to the telecommunications device by the service center, with the second service message in the second session, the information content requested.

6. A method for sending and receiving service messages to and from a service center as claimed in claim 1, wherein the first service message is one of a short message according to a Short Message Service and a multimedia message according to a Multimedia Message Service.

7. A method for sending and receiving service messages to and from a service center as claimed in claim 1, wherein the second service message is one of a short message according to a Short Message Service and a multimedia message according to a Multimedia Message Service.

8. A method for sending and receiving service messages to and from a service center as claimed in claim 1, wherein the telecommunications device is one of a cordless telephone with a cordless base station and at least one cordless handset, and a corded telephone, and a fixed network connection is used as the telecommunications call between the respective telephone and the service center.

9. A method for sending and receiving service messages to and from a service center as claimed in claim 1, wherein a mobile telephone is used as the
telecommunications device and a mobile radio call is used as the telecommunications call between the mobile telephone and the service center.

10. A telecommunications device for transmitting and receiving service messages to and from a service center, comprising:
a user interface for entering user commands and outputting user information;
a central control device for controlling functional and operational sequences in the telecommunications device, the central control device being connected to the user interface; and
a telecommunications device/service center interface for telecommunications calls to the service center, the telecommunications device/service center interface including sending and receiving parts connected to the central control device;
wherein the user interface, the central control device and the sending part are implemented such that a telecommunications call to the service center is set-up;
wherein the user interface, the central control device and the receiving part are implemented so as to detect that the service center has initiated a first session on the telecommunications call set-up;
wherein the user interface, the central control device and the sending and receiving parts are implemented in such a way that, in the first session, the telecommunications device sends, via the sending part, a first service message to the service center, receipt of which is acknowledged by the service center;
wherein the central control device is assigned an evaluation/control part which is implemented in such a way that, as a result of the acknowledgement from the service center received via the receiving part, a second session is initiated via the sending part on the telecommunications call set-up;
wherein the user interface, the central control device and the sending and receiving parts are implemented in such a way that, in the second session, the service center sends the telecommunications device at least one second service message, receipt of which is acknowledged by the telecommunications device; and
wherein the user interface, the central control device, and the sending and receiving parts are implemented in such a way that, for release of the second session by the service center, the
service center is sent an acknowledgement, via the sending part, pursuant to which the telecommunications call is cleared down.

11. A telecommunications device for transmitting and receiving service messages to and from a service center as claimed in claim 10, wherein the central control device includes a time monitoring part for monitoring a duration of the second session.

12. A telecommunications device for transmitting and receiving service messages to and from a service center as claimed in claim 11, wherein the duration is 60 seconds.

13. A telecommunications device for transmitting and receiving service messages to and from a service center as claimed in claim 10 wherein the first service message effects that, in the first session, downloadable information content which is one of stored in the service center, made available by the service center and procured by the service center is requested by the telecommunications device.

14. A telecommunications device for transmitting and receiving service messages to and from a service center as claimed in claim 13, wherein the second service message effects that, in the second session, the information content requested is transmitted to the telecommunications device by the service center.

15. A telecommunications device for transmitting and receiving service messages to and from a service center as claimed in claim 10, wherein the first service message is one of a short message according to a Short Message Service and multimedia message according to a Multimedia Message Service.

16. A telecommunications device for transmitting and receiving service messages to and from a service center as claimed in claim 10, wherein the second service message is a short message according to a Short Message Service and a multimedia message according to a Multimedia Message Service.

17. A telecommunications device for transmitting and receiving service messages to and from a service center as claimed in claim 10, wherein the telecommunications device includes at least one of a cordless telephone with a cordless base station and at least one cordless handset, and a corded telephone, with a fixed network connection connecting the respective telephone with the service center.

18. A telecommunications device for transmitting and receiving service messages to and from a service center as claimed in claim 10, wherein the telecommunications device includes a mobile telephone, with a mobile radio connection connecting the mobile telephone and the service center.

* * * * *